United States Patent

[11] 3,631,872

| [72] | Inventors | John Saxon Ivey;<br>Bernard John Frost, both of Hitchin, England |
|---|---|---|
| [21] | Appl. No. | 23,949 |
| [22] | Filed | Mar. 30, 1970 |
| [45] | Patented | Jan. 4, 1972 |
| [73] | Assignee | Borg-Worner Limited<br>Letchworth, Herts, England |
| [32] | Priority | Apr. 2, 1969 |
| [33] | | Great Britain |
| [31] | | 17,394/69 |

[54] GOVERNORS
5 Claims, 4 Drawing Figs.

[52] U.S. Cl. .................................................... 137/56, 74/573, 287/52.08
[51] Int. Cl. ....................................................... G05d 13/36, G05d 13/02
[50] Field of Search ............................................ 137/54, 55, 56; 74/573, 603; 287/52.08; 279/83

[56] References Cited
UNITED STATES PATENTS

| 3,139,102 | 6/1964 | Powell | 137/54 |
|---|---|---|---|
| 3,049,028 | 8/1962 | English et al. | 137/56 X |
| 3,120,338 | 2/1964 | Rhodes | 74/603 X |
| 3,225,624 | 12/1965 | Creter | 74/573 |
| 3,012,825 | 12/1961 | Bullens | 287/52.08 X |
| 3,479,072 | 11/1969 | Kosar | 287/52.08 |
| 1,497,735 | 6/1924 | Richardson | 74/573 |

FOREIGN PATENTS

| 1,415,019 | 9/1965 | France | 287/52.08 |

Primary Examiner—Robert G. Nilson
Attorney—Robert L. Zieg

ABSTRACT: A governor for a hydraulically controlled automatic transmission having a one-piece housing including a valve member slidable in the housing and connected to a governor weight to cause movement thereof, and therefore selective opening and closing of parts in the housing, in response to rotational speed variation of the housing. A bolt threaded to the housing on the opposite side thereof to the governor weight acts as a counterbalance, secures the housing to the output shaft of the transmission and forces the housing tightly against the shaft whereby fluid passages in the housing and shaft are sealingly interconnected.

INVENTORS
JOHN SAXON IVEY
BERNARD JOHN FROST
BY Robert L. Zieg
ATTORNEY

GOVERNORS

The present invention relates to governors of the type adapted to provide a fluid pressure signal variable in response to changes in the rotational speed of a rotatable element.

In one known form of governor particularly for automatic transmissions, provisions are made for two-phase operation, providing a relatively rapid pressure buildup at low vehicle speeds during the first phase, and a slower pressure buildup rate at higher vehicle speeds, during the second phase. This governor includes a two-part body which is secured to the output shaft of the transmission and which houses a valve. Slidable within the valve is the shaft of a governor weight which is forced outwards by centrifugal force, the governor weight being disposed outside the housing. A spring is positioned between a flange on the shaft and the valve to urge the valve radially outwards, and a counterweight is located on the housing to balance dynamically the valve and governor weight.

The construction of such a valve, as has been indicated, is in two parts with a further cover plate. These parts have to be accurately machined or gaskets provided to ensure that the hydraulic fluid within the governor housing is prevented from escaping.

According to the present invention, there is provided a governor for an automatic transmission comprising a one-piece housing, a valve member slidably mounted in said housing, ports in said housing selectively opened by said valve member, a governor weight operatively associated with said valve to cause movement thereof in response to rotational speed variation of said housing, and a bolt threaded into said housing on the opposite side of said housing from said governor weight to secure said housing to a rotational element of a transmission.

In a particularly convenient construction, he weighted bolt is provided either with a rounded boss on the end which engages in the recess, which may simply be a shallow drilled recess in the shaft, or a small ball is engaged in this recess and a similar recess in the end of the bolt.

The bolt serves both as a counterweight or balancing means to ensure dynamic balancing of the governor and also serves to secure the housing both axially and against relative rotation. This provides a simplified arrangement as compared with the conventional construction in which the housing is prevented from axial movement by abutment against a shoulder on the shaft on one side, and by a circlip on the other side, relative rotation being prevented by a suitable key. Furthermore, the bolt serves to draw the housing firmly against the shaft, so that transversely extending passages formed in the housing can be formed accurately and sealingly against bores or channels formed in the shaft, for the passage of hydraulic fluid to and from the governor assembly.

The invention also provides an automatic transmission including a governor according to the invention secured by means of the screwed bolt to the output shaft thereof.

In order that the invention may be more readily be understood, the following description is given, merely by way of example, reference being made to the accompanying drawings in which.

Figure 1:
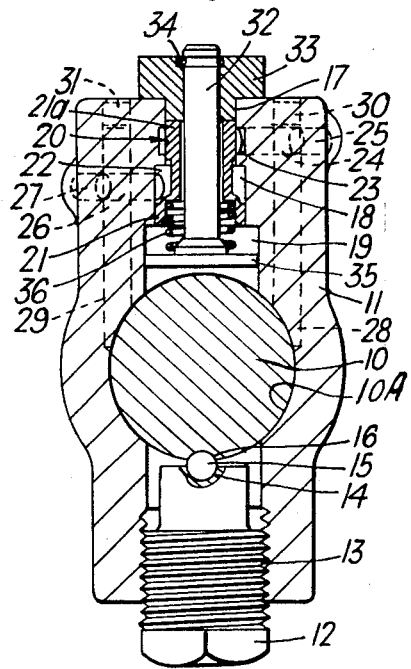
FIG. 1 is a cross-sectional view through one embodiment of governor according to the invention.

FReferring to the drawing, there is illustrated in FIG. 1 a governor according to the invention mounted on the output shaft 10 of an automatic transmission (not shown). the governor housing 11 is formed in one ppiece and with a through bore 10A which is slipped over the end of the output shaft 10 and is secured thereto by a weighted bolt or balanceing means 12 which is threaded into the housing by threads 13. At its radially inner end, the bolt 12 is formed with a recess 14 in which is engaged a small ball 15 which also registers in a drilled recess 16 in the output shaft 10. The bolt 12 serves as a balanceing means or counterweight for the other compenents of the governor which sare mounted on opposite sides of the s hsaft. It also serves to retain the governor housing accurately both axially and against rotation on the shaft 10.

Figure 1A:
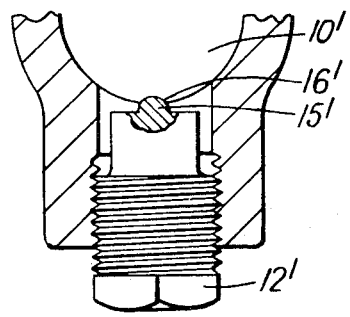
FIG. 1A is a fragmentary view showing, similar to a portion of FIG. 1, a modified arrangement.
Figure 2:
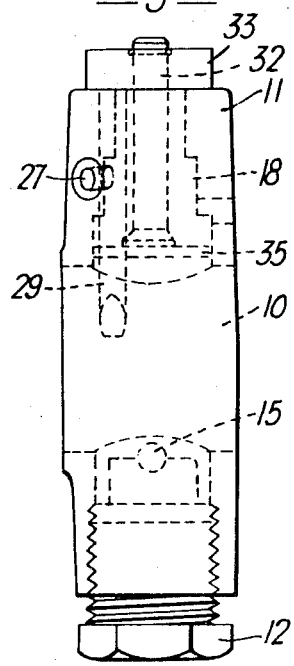
FIG. 2 is a side view of the governor of FIG. 1.
Figure 3:
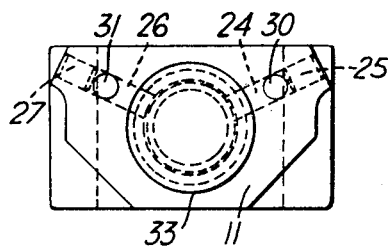
FIG. 3 is a top plan view of the governor of FIGS. 1 and 2.

In the modified construction illustrated in FIG. 1A the bolt 12'is formed with an integral rounded boss 15'engaging in a drilled recess 6'in the shaft 10

On the side of thse shaft remote from the bottle 12 is the goernor assembly proper. this includes a bore 17 in communication with an enlarged portion 18 and a further enlarged portion 19. Axially slidable within hteebore 17, for moevemet transverse to the axis of the through bore, is a valve member 20 which has a widened hear or land 21 ingaging in the enlarged portion 18 and a smaller land 21a slidable in bore 17. An annular groove 22 is formed in the external surface of the valve member between lands 21 and 21a, and a further annular groove 23 is formed in bore 17 near the radially outer end of the bore 17. nA drilled hole or paot 4 communicates with this annular groove 23, the outer and end of the hol being closed by a suitable threaded plug 25. Similarly a drilled hole or port 26 communicates with the enlarged portion 18 and this in turn is closed at its outer end by a threaded plut 27.

Further, the housing 11 is provided with two passages 28 and 29 which are drilled in the housing transveresely to the through bore on the opposite side from the ebolt 12, so as to be in communicatioon with the bors 24 and 26 respectively, those being closed at their upper ends by plugs 30 and 31 respectively.

Axially slidable within the valve member 20 is a rod 32 which carries at its radially outer end a governor weight 33 secured therego by means of circlip 34. At the radially inner end of the rod 32 is a retainer flange 35 which serves to hold a spring 36, the other axial end of which bears against theevalve member 20.

the shaft 10 is formed with axially extending bore (not shown) which communicates with the passages 28 and 29, to conduct hydraulic fluid to and from the governor. Tus, line pressure is provided, via passage 28, and governor pressure is transmitted via passage 29, to the transmission itself. Exhaust is effected through the furtehr enlarged portion 19 of the housing.

I operation, as will be clear from the following description, the governor mechanism described is essentially a two-stage gobernor having two pahses of operation or regulation. with the weight 33, the valve 20, the retainer flange 35 and the spring 36 all being subjected to centerfugal force, as the vehicle speed initially increases ine pressure is dmitted tfrom bore 24 by land 21a through groove 22 and bore 26 to governor passage 29. the pressure admitted to groove 22 acts on the differential area between lands 21 and 21a producing a force urging valve member 20 radially inward in opposition to the centrifugal force and spring 36 and tending to interrupt the admission of sluid pressure to groove 22. Tus a regulatng function is performed by the mechanism whereby a fluid pressure signal will be produced in governor passage 29 which varies with the speed of rotation of housing 11 and the amount or value of the pressure signal at any particular time will depend on: (1) the value of the line pressure admated from passage 28, (2) the force of spring 36, (3) the rotational speed of housing 11, and (4) the size of the differential area between lands 21 and 21a. As the vehicle speed increases further, the wiehgt 33 continues to move radially outwardly until the retainer plate 35 engages the shoulder between the enlarged portion 18 and the further enlarged portion 19 producing a second phase of pressure signal variation.

At all higher speeds, the weight 33 and the retainer plate 35 are supported by the housing 11 and their centrifugal force does not act upon the valve 20. SDuring the second phase of operation, the regulation of the governor pressure is gainst the centrifugal force of the valve member 20 and the spring 36 only. In addition, the spring load operates radially outwardly on the valve Accordingly, the increase in pressure is at a considerably slower rate in the second phase of operation.

It will be appreciated that the governor of the present invention is particularly suitable for use with a vehicle automatic transmission in which two automatic shifts are employed. In such a transmission the first automatic shift from the first gear to second gear occurs within the range of relatively low vehicle speeds and this can be achieved as the governor moves radially outwardly. A second gear change from second to top is effected after a more gradual pressure increase resulting from compression of the spring 36 and valve member 20.

It will be appreciated that the construction in which the bolt 12 foreces the housing surrounding the passages 8 and 29 against the shaft ensures that a completely fluidtight seal is obtained in an extremely simple manner.

We claim:

1. A governor mechanism adapted to develop a pressure signal proportional to the speed of rotation of a rotational element comprising a one-piece housing fixed for rotation with said rotational element, a valve member slidably mounted in said housing, ports in said housing selectively opened by said valve memb or a governor weight operatively associated with said valve member to cause movement thereof in response to rotational speed variation of said housing, a bolt threaded in said housing on the opposite side of said housing from said weight to secure said housing to said rotational element and said bolt having a predetermined mass whereby said bolt acts as a balancing means for said valve member.

2. A governor mechanism as claimed in claim 1 wherein said housing includes a through bore and said rotational element comprises a shaft received in said bore.

3. A governor mechanism as claimed in claim 2, wherein said housing includes transversely extending passages connected to said ports and to said through bore to pass hydraulic fluid to and from said ports and 4. Agovernor as claimed in claim 1 and including a rounded boss on said bolt adapted to engage a recess in said shaft.

5. A governor as claimed in claim 1, and including a small ball engaged in a resces in said bolt and adapted to be engaged in a recess in said shat.

* * * * *

UNITED STATES PATENT OFFICE
CERTIFICATE OF CORRECTION

Patent No. 3,631,872    Dated January 4, 1972

Inventor(s) John Saxon Ivey, et al'

It is certified that error appears in the above-identified patent and that said Letters Patent are hereby corrected as shown below:

Column 3, line 20, "memb" should read -- membor -- ; same line cancel "or". Column 4, line 13, after "and" , second occurrence, insert -- bores formed in said shaft. -- ; line 17, change "resces" to read -- recess -- ; line 18, "shat" should read -- shaft -- .

Signed and sealed this 31st day of October 1972.

(SEAL)
Attest:

EDWARD M. FLETCHER, JR.
Attesting Officer

ROBERT GOTTSCHALK
Commissioner of Patents